United States Patent [19]

Turner

[11] Patent Number: 4,469,554

[45] Date of Patent: Sep. 4, 1984

[54] ETCH PROCEDURE FOR OPTICAL FIBERS

[75] Inventor: Dennis R. Turner, Chatham Township, Morris County, N.J.

[73] Assignee: AT&T Bell Laboratories, Murray Hill, N.J.

[21] Appl. No.: 482,213

[22] Filed: Apr. 5, 1983

[51] Int. Cl.³ .................. C03C 25/06; C09K 13/08; C09K 13/06
[52] U.S. Cl. .................. 156/657; 156/659.1; 156/663; 252/79.3; 252/79.4; 204/129.75
[58] Field of Search .............. 204/129.55, 228, 129.75; 156/626, 627, 637, 663, 659.1; 252/79.3, 79.4

[56] References Cited

U.S. PATENT DOCUMENTS

| | | | |
|---|---|---|---|
| 2,628,936 | 2/1953 | Albano | 204/129.55 |
| 2,982,626 | 5/1961 | Kalnins | 156/637 |
| 3,388,047 | 6/1968 | Higgins | 204/228 X |
| 3,418,232 | 12/1968 | Emery | 204/263 |
| 3,425,928 | 2/1969 | Emery et al. | 204/263 |
| 3,471,382 | 10/1969 | Grotheer | 204/98 |
| 3,813,276 | 5/1974 | Trap | 156/626 X |
| 3,871,231 | 3/1975 | Ciarico | 73/215 |
| 3,959,046 | 5/1976 | Bussmann et al. | 156/626 X |
| 4,213,336 | 7/1980 | Schweickart et al. | 73/215 |
| 4,265,699 | 5/1981 | Ladany | 156/663 X |
| 4,305,905 | 12/1981 | Galin | 422/28 |

OTHER PUBLICATIONS

Crow, J. D. and Harper, J. S., IBM Technical Discl., vol. 20, #3, Aug. 1977, "Fabrication of Lenses on Tips of Fibers".
J. S. Sconce, *Chlorine*, Krieger Publishing Co., Huntington, N.Y., 1972, pp. 82, 95, 99.

*Primary Examiner*—Donald R. Valentine
*Attorney, Agent, or Firm*—Walter G. Nilsen

[57] ABSTRACT

A process is described for etching a tapered point on a cylindrically symmetric body using an inert liquid layer on top of the etching solution. The process is extremely useful for etching tapered points on optical fibers prior to melt-back to form a small lens to couple light from laser to optical fiber. The process produces excellent tapered points rapidly and reproducibly with a minimum of operator attention and without etch marks above the taper.

10 Claims, 6 Drawing Figures

FIG. 3
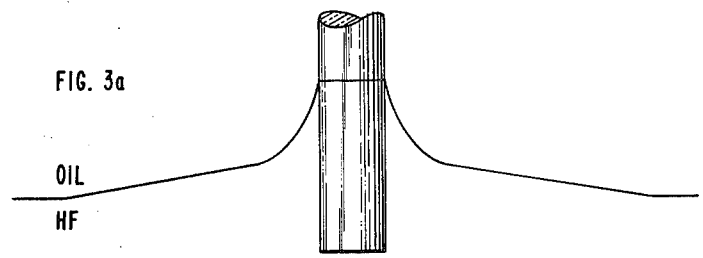
FIG. 3a
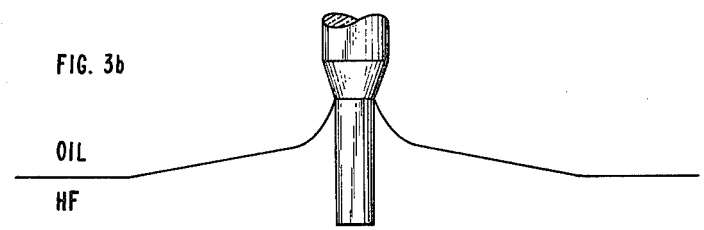
FIG. 3b
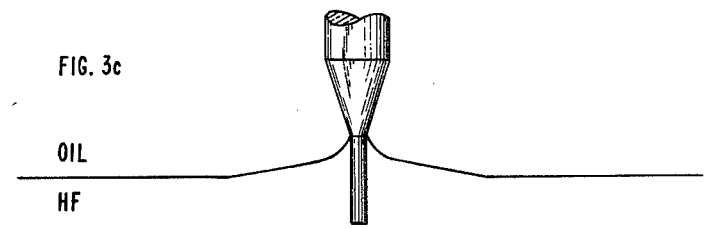
FIG. 3c
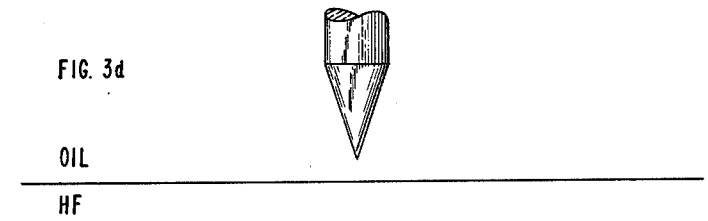
FIG. 3d

ETCH PROCEDURE FOR OPTICAL FIBERS

TECHNICAL FIELD

The invention is an etching procedure for shaping various materials including glass fibers and particularly including the ends of fibers used for optical communications.

BACKGROUND OF THE INVENTION

Various silica glass devices and articles have become of intense interest in recent years for a variety of reasons generally associated with the development of optical devices and the development of optical communication systems. Particularly important has been the development of various processes for producing silica-glass devices of high quality for use in optical devices and optical communication devices.

Much attention and effort has been applied to the manufacture of optical fibers for use in optical communication systems. Here, exact standards are required to insure low-loss and low-distortion transmission of optical signals down the optical fiber so as to achieve maximum bandwidth and maximum distance between repeater stations. Often in the manufacture of optical devices involving optical glasses (including optical fibers) various shaping operations involving etching are required.

A particularly difficult problem involves coupling radiation in and out of the ends of the optical fibers. This often involves shaping a lens type structure at the end of the fiber to increase the coupling of light between device (e.g., source or detector) and optical fiber. For example, with an optical source such as a laser, increased efficiency is obtained by shaping a small lens at the end of the optical fiber to increase the coupling of laser radiation into the optical fiber. This often requires first fabricating a point with a particular taper on the end of the fiber and then making the lens usually by a melting procedure. A reliable procedure for reproducibly making a point with a given taper at the end of an optical fiber is highly desirable.

SUMMARY OF THE INVENTION

The invention is a procedure for etching a tapered point on a cylindrically symmetric body in which a liquid layer is located on top of the etchant. In a preferred embodiment, the cylindrically symmetric body is made of glass which contains silicon dioxide. Typically, the glass body is an optical fiber used in a communication system in which the etchant is hydrofluoric acid and the glass fiber contains at least 80 weight percent silicon dioxide. The liquid in the liquid layer is less dense than the etchant so that it floats on the etchant. The liquid in the liquid layer should not be miscible with the etchant or chemically react with the etchant. Typically, various oils are used such as sunflower seed oil, mineral oil, 80W90 gear oil, etc. Use of such a liquid yields tapered points on optical fibers that are highly reproducible. Also, the liquid layer prevents escape of fumes from the etchant so that a hooded or vented operation is not required.

BRIEF DESCRIPTION OF THE DRAWING

FIG. 3 shows a series of views of an optical fiber being etched in accordance with the invention.

DETAILED DESCRIPTION

Figure 1:
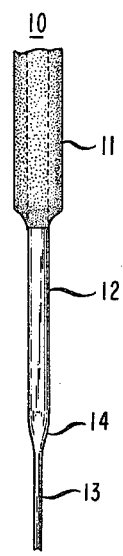
FIG. 1 shows a typical optical fiber with coating partially removed and the end partially etched.

The invention involves an etching procedure for fabricating tapered points on roughly cylindrically symmetric bodies. The invention is based on the discovery that use of an inert liquid layer above the etchant is highly advantageous. It produces cleanly tapered points without producing any etching above the taper. The process is highly reproducible. The liquid layer also prevents fumes from the etchant from escaping into the atmosphere.

In general, the invention is applicable to a large number of situations where an etchant is used to shape a particular body. It is most often used to shape cylindrically symmetric structures—typically a tapered point—in a variety of substances that can be etched by a chemical etching agent. A particular important use of such a tapered point in optical fibers is to make small lenses by melt-back for coupling light from sources to fiber or from fiber to detector.

Although the process has largely been directed toward glass fibers for communication use, the invention is applicable to a large variety of materials. In particular, it is applicable to any material that can be chemically etched such as glass, metals (including alloys), crystals (including polycrystalline materials), plastics, etc.

Various etchants may be used in the practice of the invention. Generally, the etchant should etch the material being etched at a reasonable rate and the etch should etch approximately isotropically (although rotation of the material around the cylindrical axis might increase the isotropic nature of the process). Generally, a smooth etch (one that does not produce pits) is the most useful, naturally. Typical etchants are aqueous HF for titanium, and various glasses including quartz glass and aqueous sodium perchlorate for copper.

The nature of the liquid used in the liquid layer is also of importance in the practice of the invention. Generally, the liquid should not be miscible in the etching solution. Naturally, some miscibility is permitted provided a separate layer of liquid remains above the etchant. Generally, miscibility should be less than about 20 volume percent.

Also, the density of the liquid in the liquid layer should be less than the density of the etchant so that the liquid layer floats on the etchant. Generally, the etchant is an aqueous solution with density near 1 gm/cc. Thus, the liquid in the liquid layer should have a density less than 1 gm/cc. Mixtures of liquids (either miscible in one another or not) may be used to adjust properties such as density and adherence to the material being etched.

The liquid in the liquid layer should also be chemically inert to the etchant. A limited amount of chemical attack is tolerable, but excessive attack should be avoided. Also, low vapor pressure is preferred to avoid evaporation of the liquid and to prevent the escape of fumes.

Typical liquids that are useful as liquid layers are sunflower seed oil, mineral oil, 10–40 or 20–50 motor oil, heavy gear oil (80W90), various synthetic motor oils, castor oil, corn oil, linseed oil, whale oil, Neat's foot oil, etc.

Generally, the taper obtained in etching points in materials like glass have an angle of about 28 degrees. Limited experiments seem to indicate that the taper angle does not depend on the liquid in the liquid layer. The angle of the taper is most easily changed by slowly moving the body being etched either up or down depending on whether a narrower or wider taper is desired.

A preferred embodiment of the invention is the fabrication of small lenses at the ends of optical fibers by first etching a point on the fiber and then melting the point to form the lens. Typically, the optical fiber (often called quartz fiber) is made mostly of silicon dioxide with small amounts of germanium and phosphorus (and often other materials) present to adjust index of refraction, glassiness, etc. The fiber is usually made of at least 90 weight percent silicon dioxide, often more than 95 weight percent.

Experiments were carried out on a typical fiber cable (a single mode optical cable quartz fiber) with outside diameter of 125 μm. About 100 μm of this diameter is outside organic coating which is removed in hot (about 110 degrees C.) concentrated sulfuric acid.

The fiber is conveniently etched using a rather concentrated solution of hydrofluoric acid (generally between 35 weight percent and about 100 weight percent but usually the standard HF solution of about 49 weight percent).

The etching operation is carried out by inserting the exposed quartz fiber into the etching solution which is covered with a liquid layer (generally sunflower seed oil). A typical side view of the optical cable 10 in the process of being etched is shown in FIG. 1. The organic coating 11 has been removed from the end of the cable, exposing the quartz fiber. The end of the quartz fiber 35 has been partially etched and the level of the etching solution 14 is near the end of the taper. Continued etching produces a tapered point.

Figure 2:
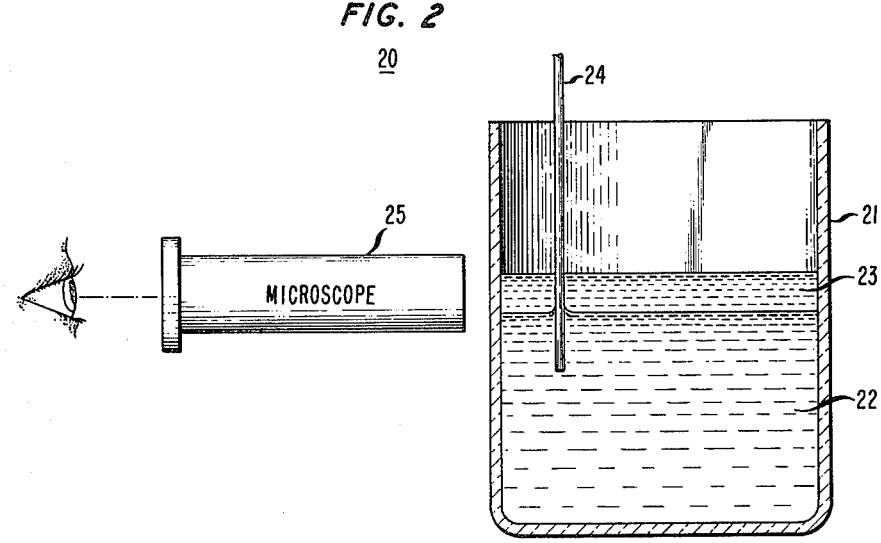
FIG. 2 shows a typical apparatus for the practice of the invention including etchant, container, liquid layer and means to monitor etching process.

FIG. 2 shows a typical apparatus 20 with container 21 filled with etchant 22 and liquid layer 23. Immersed in the etchant 22 and liquid layer 23 is a cylindrical body 24 (generally a glass fiber) to be etched into the form of a tapered point. Also shown is a microscope for observing the etching process.

FIG. 3 shows various stages in the etching process. FIG. 3a shows the fiber when initially immersed in the etchant and liquid layer (labeled oil). Gradually, the fiber is etched as shown in FIG. 3b and the contact of fiber with etchant gradually drops down. Continued etching produces an etched taper as shown in FIG. 3c. The etching process is completed as the etchant drops away from the fiber as shown in FIG. 3d. Repetition of the same process produces tapers of the same shape and geometry. The process is automatic in that when the point is formed and the etchant-liquid interface breaks away from the quartz, all etching stops.

Often, in the case of optical fibers, the tapered point is further processed to fabricate a lens on the end of the optical fiber to improve coupling between laser source and optical fiber or between optical fiber and detector. The lens is usually formed by melting back the tapered point using a source of heat such as an electric arc. A particular advantage of the etching process is that the reproducibility of the tapered point so that the lens forming process produces lenses of identical properties.

What is claimed is:

1. Process comprising at least partially immersing a cylindrically symmetric body in first liquid in order to etch the cylindrically symmetric body characterized in that a second liquid is located on top of the first liquid, said second liquid being substantially non-etching and substantially immiscible in the first liquid and the cylindrically symmetric body is a glass optical fiber consisting of at least 80 weight percent silicon dioxide.

2. The process of claim 1 in which the second liquid has density less than the first liquid.

3. The process of claim 2 in which the second liquid consists essentially of at least one substance selected from the group consisting of sunflower seed oil, mineral oil, motor oil, heavy gear oil, synthetic motor oil, castor oil, corn oil, linseed oil, and whale oil.

4. The process of claim 1 in which the cylindrically symmetric body is etched to a tapered point.

5. The process of claim 1 in which the glass optical fiber consists of at least 90 weight percent silicon dioxide.

6. The process of claim 5 in which the glass optical fiber consists of at least 95 weight percent silicon dioxide.

7. The process of claim 1 in which the first liquid is aqueous hydrofluoric acid.

8. The process of claim 7 in which the concentration of the aqueous hydrofluoric acid is between 35 weight percent and near 100 weight percent.

9. The process of claim 8 in which the concentration of the aqueous hydrofluoric acid is about 49 weight percent.

10. Process for producing an optical fiber with a lens by melting back a tapered point to form the lens in which the tapered point is made by at least partially immersing the optical fiber in a first liquid in order to etch the optical fiber characterized in that a second liquid is located on top of the first liquid, said second liquid being substantially non-etching and substantially immiscible in the first liquid.

* * * * *